United States Patent [19]

McInroy et al.

[11] Patent Number: 5,180,306
[45] Date of Patent: Jan. 19, 1993

[54] EDUCATIONAL ART GAME

[76] Inventors: Thomas R. McInroy, 409 E. Market Street, McConnellsburg, Pa. 17233; Nancy S. McInroy, 306 Burton Street, Bath, N.Y. 14810

[21] Appl. No.: 650,188

[22] Filed: Feb. 4, 1991

[51] Int. Cl.⁵ ................. G09B 19/22; A63F 1/00; A63F 9/20
[52] U.S. Cl. .................. 434/129; 273/292; 273/302
[58] Field of Search ............. 434/129; 273/292, 302, 273/85 CP, 308

[56] References Cited

U.S. PATENT DOCUMENTS

| | | | |
|---|---|---|---|
| 1,060,900 | 5/1913 | Hobbes | 273/308 |
| 1,138,534 | 5/1915 | Brister | 273/302 |
| 1,269,320 | 6/1918 | Scholz | 273/302 |
| 1,273,864 | 7/1918 | Johnson | 273/307 |
| 1,609,981 | 12/1926 | Backemeyer | 273/308 |
| 1,617,772 | 2/1927 | Sergel et al. | 273/308 |
| 1,991,468 | 10/1934 | Schoolfield | 273/307 |
| 5,042,818 | 8/1991 | Weingardt | 273/292 |

Primary Examiner—Gene Mancene
Assistant Examiner—Cindy AS. Cherichetti
Attorney, Agent, or Firm—Robert J. Bird

[57] ABSTRACT

A card game for educational exposure to selected art topics at apprentice, journeyman, and master levels on each topic, includes a deck of cards for each level of play and for each art topic. Each deck includes an Art Man card and a duplicate set of cards, each including a pictorial representation of a work of art. The cards for play at the apprentice and journeyman levels each also identify of the works represented on them. Play is as follows: The deck is distributed among the players. The dealer tables any and all matching pairs in his hand while reciting the name and origin of each work of art represented, takes one card from the player on his side opposite the progression of play, and similarly tables a pair if one results from this taking. The next player tables any and all matching pairs in his hand while reciting the name and origin of each work of art represented, takes one card from the previous player, and similarly tables a pair if one results from this taking; and so on until all cards showing works of art have been matched and tabled and only the Art Man card remains. The holder of the Art Man card is the loser. A computer version of the game is played in an analogous way.

4 Claims, 1 Drawing Sheet

EDUCATIONAL ART GAME

Background Information

The subject of this invention is a game which teaches art appreciation in a way which is both entertaining and educationally sound. The basic concept is to match pairs of graphic reproductions of famous art works of painting, architecture, and sculpture, and to identify them by name and by artist or origin. The game is called Art Bits. It is primarily a card game but is adaptable for play by computer.

There are many well known card games in which the players draw cards from a deck or from each other, the typical object being to collect pairs or decks of similar cards, to discard superfluous cards, and to finish with no cards or with the fewest cards remaining in one's hand.

The present invention, as a card game, is played by such a method. The cards for this game, however, each include a graphic reproduction of a work of art. In one version of the game, each card also includes identification of the work by name and artist. In another version, this identifying material is omitted.

In addition to the above mentioned card games, the most relevant prior art that we know of is U.S. Pat. No. 1,273,864 to Johnson, issued in 1918. The Johnson patent discloses a pack of playing cards including a number of sets of cards, one set for one artist. Each card in a set includes a reproduction of a work of that artist, the name of the artist, the name of that work, and the names of other works of that artist on the other cards in the set. As to the method of play, the patent states only that it is similar to the "familiar game of authors". The purpose of the game is educational.

SUMMARY OF THE INVENTION

In summary this invention is a game for educational exposure to a selection of art topics and for play at an apprentice level, a journeyman level, and a master level on each topic. The game is playable with cards or on a computer.

The card game includes a deck of cards for each level of play and for each art topic. Each deck includes an Art Man card and a duplicate set of cards each including a pictorial representation of a work of art. The cards for play at the apprentice and journeyman levels each also include identification of the work represented on the card by the name and origin of the work.

The card game is played by three or more players as follows:

a. the deck is distributed among the players;

b. the dealer tables any and all matching pairs in his hand while reciting the name and origin of each work of art represented, takes one card from the player on his side opposite the progression of play, and similarly tables a pair if one results from this taking;

c. the next player tables any and all matching pairs in his hand while reciting the name and origin of each work of art represented, takes one card from the previous player, and similarly tables a pair if one results from this taking; and so on until all cards showing works of art have been matched and tabled and only the Art Man card remains. The holder of the Art Man card is the loser.

The computer version of the game includes a set of computer images for each level of play and for each art topic. Each set includes an Art Man image and a duplicate set of images, each of a work of art. The images for play at the apprentice and journeyman levels each also include identification of the work represented by the image by the name and origin of the work.

The computer game is played by one to three players as follows: A work of art appears at the bottom left of a computer screen, identified by title and artist. A grid with squares numbered one to eighteen appears at the right of the screen. The player selects one such square, revealing a work of art. If the selected work matches that shown at bottom left, the player has a match and receives a point, and a new image appears at the bottom left. If there is no match, or if the player's selection turns up an Art Man image, the play progresses to the next player. The game continues until all squares have been matched with the images appearing at the bottom left, and the player with the most points is the winner.

DRAWING

DESCRIPTION

The card game of this invention includes nine separate decks of cards. There are three decks of cards for an "Apprentice level" of the game, three for a "Journeyman level", and three for a "Master level". The three levels, in turn, each include three topics; Painting, Architecture, and Sculpture. Thus the nine decks of cards. Individual decks of cards will be hereinafter identified by level and topic, e.g. apprentice/painting or master/sculpture.

Each card includes a reproduction of a work of art. Each card at the apprentice level and each card at the journeyman level also includes the name of the work and the name of the artist. The apprentice level cards include works of art that are more easily recognized and identified. The journeyman level cards include works that are not so easily recognized or identified.

The computer game of this invention also includes nine sets of images; the same as the nine decks of cards in the card game. Each computer image is a reproduction of a work of art, those at the apprentice and journeyman levels also including the identifying information.

Figure 1:
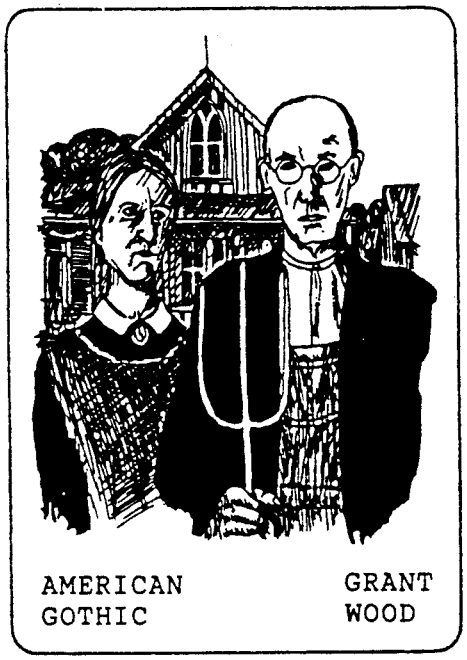
FIG. 1 is a view of an exemplary card from the apprentice/painting deck of cards.

The card of FIG. 1 is a card from the apprentice/painting deck. The illustrated card is card number 9 in the list below. It includes a picture of an art work, the name of the work (American Gothic), and the name of the artist (Grant Wood). The full deck of apprentice/painting cards includes one Art Man card and two cards of each of the following:

| Name of Work | Artist |
| --- | --- |
| 1. Mona Lisa | Leonardo da Vinci |
| 2. Praying Hands | Albrecht Durer |
| 3. Mexican Child | Diego Rivera |
| 4. Blue Boy | Thomas Gainsborough |
| 5. Rembrandt Self Portrait | Rembrandt |
| 6. Agony in the Garden | El Greco |
| 7. Head of Christ | Leonardo da Vinci |
| 8. Over There | Norman Rockwell |
| 9. American Gothic | Grant Wood |
| 10. Madonna with Singing Angels | Sandro Botticelli |

-continued

| Name of Work | Artist |
| --- | --- |
| 11. White Plumes | Henri Matisse |
| 12. Pinkie | Lawrence |
| 13. Van Gogh Self Portrait | Vincent Van Gogh |
| 14. La Danseuse | Edgar Degas |
| 15. Cypress with a Star | Vincent Van Gogh |
| 16. The Folies Bergere | Edouard Manet |
| 17. Madonna | Bellini |

Figure 2:
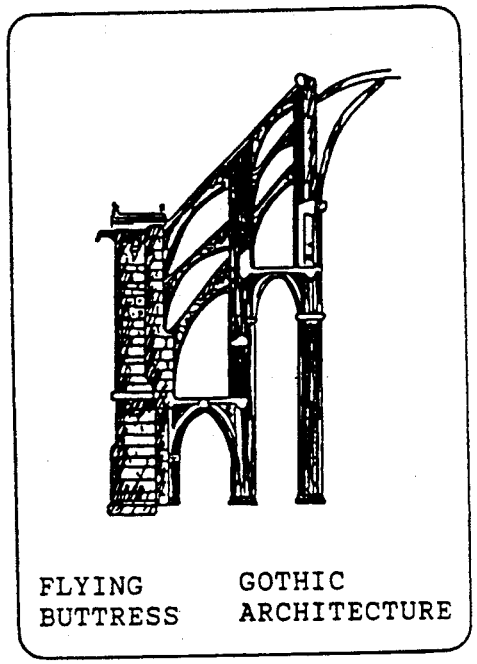
FIG. 2 is a view of an exemplary card from the apprentice/architecture deck of cards.

The card of FIG. 2 is a card from the apprentice/architecture deck. The illustrated card is card number 3 in the list below. It includes a picture of an art work, the name of the work (Flying Buttress), and the name of the artist or origin (Gothic Architecture). The full deck of apprentice/architecture cards includes one Art Man card and two cards of each of the following:

| Name of Work | Artist or Origin |
| --- | --- |
| 1. Arc de Triomphe | J. F. Chalgrin, French |
| 2. Chartres Cathedral | French |
| 3. Flying Buttress | Gothic |
| 4. Geodesic Dome | Buckminster Fuller |
| 5. Colosseum | Roman |
| 6. Pont du Gard (aqueduct) | Roman |
| 7. Buddhist Pagoda | Chinese |
| 8. Saint Basil's Cathedral | Barma & Postnik, Russian |
| 9. Eiffel Tower | Alexander Eiffel, French |
| 10. Skyscraper | Louis Sullivan, American |
| 11. Falling Water | Frank Lloyd Wright |
| 12. Stonehenge | Celtic |
| 13. Pyramids | Egyptian |
| 14. Parthenon | Greek |
| 15. Corinthian Column | Greek |
| 16. Doric Column | Greek |
| 17. Ionic Column | Greek |

Figure 3:
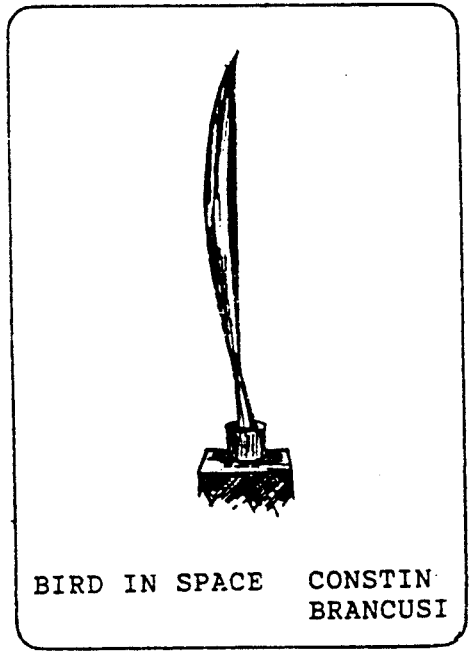
FIG. 3 is a view of an exemplary card from the apprentice/sculpture deck of cards.
Figure 4:
FIG. 4 is a front view of an Art Man card.

The card of FIG. 3 is a card from the apprentice/sculpture deck. The illustrated card is card number 4 in the list below. It includes a picture of an art work, the name of the work (Bird in Space), and the name of the artist or origin (Constantin Brancusi). The full deck of apprentice/sculpture cards includes one Art Man card and two cards of each of the following:

| Name of Work | Artist or Origin |
| --- | --- |
| 1. Chinese Owl | Chinese, 1000 B.C. |
| 2. Statue of Liberty | Frederic A. Bartholdi |
| 3. Nefertiti | Egyptian, B.C. |
| 4. Bird in Space | Constantin Brancusi |
| 5. Great Sphinx | Egyptian, B.C. |
| 6. Sumerian Standing Ram | Mesopotamian, B.C. |
| 7. Venus de Milo | Greek |
| 8. Mask of Tutankhamen | Egyptian, B.C. |
| 9. Pieta | Michelangelo Buonarroti |
| 10. Winged Victory | Greek |
| 11. Chimera | Chinese, B.C. |
| 12. Spring Blossoms | Alexander Calder |
| 13. Pointing Man | Giacometti |
| 14. Gates of Paradise | Lorenzo Ghiberti |
| 15. Moses | Michelangelo Buonarroti |
| 16. Orpheus Fountain | Carl Miles |
| 17. Tired | Elizabeth Catlett |

The full deck of journeyman/painting cards includes one Art Man card and two cards of each of the following:

| Name of Work | Artist |
| --- | --- |
| 1. A Cowboy of the Plains | Frederick Remington |
| 2. The Pool of Water Lillies | Claude Monet |
| 3. The Gulf Stream | Winslow Homer |
| 4. Sunday Afternoon on the Island of LaGrand Jatte | Georges Seurat |
| 5. Broadway Boogie-Woogie | Piet Mondrian |
| 6. George Washington | Gilbert Stewart |
| 7. Violin and Jug | Georges Braque |
| 8. Guernica | Pablo Picasso |
| 9. The Starry Night | Vincent Van Gogh |
| 10. Goldfish | Henri Matisse |
| 11. The Card Players | Paul Cezanne |
| 12. The Calling of Saint Matthew | Caravaggio |
| 13. Siesta | Paul Gauguin |
| 14. Cave Painting | Cave Man |
| 15. Water Figure | Jackson Pollock |
| 16. Nocturnal Interlude | Bridget Riley |
| 17. Christina's World | Andrew Wyeth |

The full deck of journeyman/architecture cards includes one Art Man card and two cards of each of the following:

| Name of Work | Artist or Origin |
| --- | --- |
| 1. Taj Mahal | Indian |
| 2. Sydney Opera House | Australian |
| 3. Cliff Dwelling | North American Indian |
| 4. Washington Monument | Robert Mills |
| 5. Golden Gate Bridge | Several |
| 6. United States Capitol | Charles Bullfinch, others |
| 7. Guggenheim Museum | Frank Lloyd Wright |
| 8. Trans World Airlines Terminal | Eero Saarinen |
| 9. Empire State Building | Shreve, Lamb & Harrison |
| 10. Lincoln Memorial | Henry Bacon |
| 11. Gateway Arch | Eero Saarinen |
| 12. Pentagon Building | G. E. Bergstrom |
| 13. Badshahi Mosque | Indian |
| 14. Windmill | Dutch |
| 15. Ziggurat of Ur | Sumerian |
| 16. Habitat | Moshe Shafdie |
| 17. Adobe "Apartment Houses" | Pueblo Indians |

The full deck of journeyman/sculpture cards includes one Art Man card and two cards of each of the following:

| Name of Work | Artist or Origin |
| --- | --- |
| 1. The Thinker | Auguste Rodin |
| 2. The Burghers of Calais | Auguste Rodin |
| 3. Mosaic of Empress Theodara | Byzantine |
| 4. Painted Arches | Alexander Calder |
| 5. Marine Memorial | American |
| 6. Variation Linear No. 2 | Naum Gabo |
| 7. David | Michelangelo Buonarroti |
| 8. Reliquary of Saint Faith | Christian Relic |
| 9. Snake Goddess | Crete |
| 10. Charlemagne on His Horse | French |
| 11. Comin' Through the Rye | Frederick Remington |
| 12. Reclining Figure | Moore |
| 13. Amphisculpture | Pepper |
| 14. Spiral Getty | Smithson |
| 15. Stegowagenvolkssaurus | Patricia Renick |
| 16. Homage to the World | Louise Nevelson |
| 17. Primitive Mask | African |

The card game is played as follows:

Three or more players are needed. There are 35 cards in each of the nine decks; one Art Man card and two each of 17 art reproductions. The cards are first shuffled and distributed. The dealer plays first, and places any and all matching pairs in his hand face up on the table, at the same time reciting the name and artist of each work being tabled. He then takes one card from the player on his right. If it matches a card in his hand, he also tables that pair while reciting its name and artist. That turn is now over. Play proceeds clockwise. The second player is to the left of the first and follows the same steps. The third player is to the left of the second and follows the same steps. The game proceeds in this way until all cards showing works of art have been matched and tabled, and only the Art Man card remains. The holder of the Art Man card is the loser of the game.

The master level of the game combines the art works from the apprentice and journeyman levels. However, unlike the cards for the apprentice and journeyman levels, the cards in the master decks do not identify art works or artists. The cards instead include numbers referring to a Key Card which in turn includes the identifying information. The Key Card is only an answer card, and is not a part of the game. At the master level, if a player recites an incorrect name or artist, that pair of cards is returned to the player's hand and the game continues. If a matching pair of cards cannot be identified by any player, it will be declared a dead pair. The player left with the Art Man card after all matching pairs have been tabled is the loser of the game.

The computer game includes a set of computer images for each level of play and for each art topic. Each set includes an Art Man image and a duplicate set of images, each of a work of art. The images for play at the apprentice and journeyman levels each also include identification of the work represented by the image by the name and origin of the work.

The computer version of the game is played as follows:

One to three players are needed. A work of art to be matched appears in a display square at the bottom left of a computer screen, identified by title and artist. A grid with squares numbered one to eighteen appears at the right of the screen. The player selects one such square, revealing a work of art. If the selected work matches that shown at bottom left, the player has a match and receives a point, and a new image appears at the bottom left. If there is no match, or if the player's selection turns up an Art Man image, the play progresses to the next player. The game continues until all squares have been matched with the images appearing at the bottom left, and the player with the most points is the winner.

The master level of the computer version of the game also combines the art works from the apprentice and journeyman levels, and also omits their identifying information. The images instead include numbers referring to a Key image which in turn includes the identifying information. The Key image is only an answer reference, and is not a part of the game. At the master level of the computer version, if a player makes an incorrect identification, the play continues to the next player. If a matching pair of images cannot be identified by any player, it will be declared a dead pair. The player left with the Art Man image after all matching pairs have been played or declared dead is the loser of the game.

The foregoing description of specfic versions of this game is intended as illustrative. Variations of the method of the game are possible, and there are many other works of art that might have been chosen for the purpose of the game. The important thing is to expose the players to the art works and information on the cards as they play the game. The concept and scope of the invention are thus limited only by the following claims and equivalents thereof. Male personal pronouns (he, his) are used herein only for convenient reference to a player.

What is claimed is:

1. A method of playing a card game by a number of players as follows:
    a. distributing among said players a deck of cards, said deck including a single Art Man card and a number of matching pairs of cards each bearing a pictorial representation of a work of art;
    b. a first player tabling any and all matching pairs in his hand while reciting the name and origin of each work of art represented thereon, taking one card from the player on his side opposite the progression of play, and similarly tabling a pair if one results from such taking;
    c. the next player tabling any and all matching pairs in his hand while reciting the name and origin of each work of art represented thereon, taking one card from the previous player, and similarly tabling a pair if one results from such taking; and
    d. repeating step c until all cards showing works of art have been matched and tabled and only the Art Man card remains.

2. A method of playing a card game as defined in claim 1, each of said cards further including identification of the work represented thereon by name and origin.

3. A method of playing a game by one or more players as follows:
    a. displaying on a screen, one at a time, a set of images including a single Art Man image and a number of images each of a work of art;
    b. displaying on said screen a second image from a blind selection menu to match the image displayed in step a and, if a match is made, reciting the identification of the work represented by said matching images by the name and origin thereof;
    c. repeating step b until all images have been displayed and matched, or until no match is made, or until an Art Man image appears, whereupon play progresses to the next player; and
    d. repeating step c until all images have been displayed and matched, and only the Art Man image remains.

4. A method of playing a game as defined in claim 3, each of said images further including identification of the work represented therein by name and origin.

* * * * *